United States Patent [19]

Sabourin

[11] Patent Number: 4,808,203

[45] Date of Patent: Feb. 28, 1989

[54] DUST COLLECTOR

[75] Inventor: Hubert Sabourin, Alexandria, Canada

[73] Assignee: Hubert Sabourin Inc., Ontario, Canada

[21] Appl. No.: 145,669

[22] Filed: Jan. 14, 1988

Related U.S. Application Data

[63] Continuation of Ser. No. 819,845, Jan. 17, 1986, abandoned.

[51] Int. Cl.⁴ .............................................. B01D 46/02
[52] U.S. Cl. ........................................ 55/492; 55/497; 55/500; 55/508; 55/511
[58] Field of Search .................. 55/374, 376, 378–381, 55/491, 492, 497, 500, 505, 508, 509, 511, DIG. 12

[56] References Cited

U.S. PATENT DOCUMENTS

| | | | |
|---|---|---|---|
| 971,013 | 9/1910 | Smith, Jr. | 55/378 |
| 1,268,304 | 6/1918 | Warren | 55/379 X |
| 1,500,128 | 7/1924 | Harrison | 55/500 X |
| 1,899,007 | 2/1933 | Birkholz | 55/500 |
| 2,013,498 | 9/1935 | McConaughy | 55/376 |
| 2,050,508 | 8/1936 | Strindberg | 55/500 X |
| 2,080,154 | 5/1937 | Strindberg | 55/500 |
| 2,907,408 | 10/1959 | Engle et al. | |
| 3,187,489 | 6/1965 | Bauder et al. | |
| 3,204,392 | 9/1965 | Schwab | 55/374 X |
| 3,354,620 | 11/1967 | Scholl et al. | 55/378 X |
| 3,372,534 | 3/1968 | Hysinger et al. | 55/378 X |
| 3,385,033 | 5/1968 | Basore et al. | |
| 3,400,517 | 9/1968 | Sare | 55/378 |
| 3,470,680 | 10/1969 | Avera | |
| 3,606,739 | 9/1971 | Peterson | 55/500 X |
| 4,199,456 | 4/1980 | Cheesman | 55/492 X |
| 4,323,376 | 4/1982 | Rosenquest | |
| 4,449,993 | 5/1984 | Bergeron | |

FOREIGN PATENT DOCUMENTS

| | | | |
|---|---|---|---|
| 791481 | 8/1968 | Canada | |
| 885589 | 11/1971 | Canada | |
| 942204 | 2/1974 | Canada | |
| 1096318 | 2/1981 | Canada | |
| 272845 | 4/1914 | Fed. Rep. of Germany | 55/509 |
| 312697 | 6/1919 | Fed. Rep. of Germany | 55/509 |
| 2931403 | 3/1980 | Fed. Rep. of Germany | 55/491 |
| 622484 | 9/1978 | U.S.S.R. | 55/500 |
| 21200 | of 1913 | United Kingdom | 55/508 |
| 905113 | 9/1962 | United Kingdom | 55/381 |

Primary Examiner—Charles Hart
Attorney, Agent, or Firm—Lewis H. Eslinger; Jay H. Maioli

[57] ABSTRACT

A dust collector of a large capacity suitable for cleaning air or gases and for separating out by-products of an industrial process for further utilization. The collector generally comprises a continuous and integral filter medium which is suspended form a plurality of downwardly extending frames forming a series of separate elements having a triangular cross-section, each element being relatively wide at the top and narrow at the bottom to define, between adjacent elements, a divergent collecting space which is wide at the bottom.

4 Claims, 9 Drawing Sheets

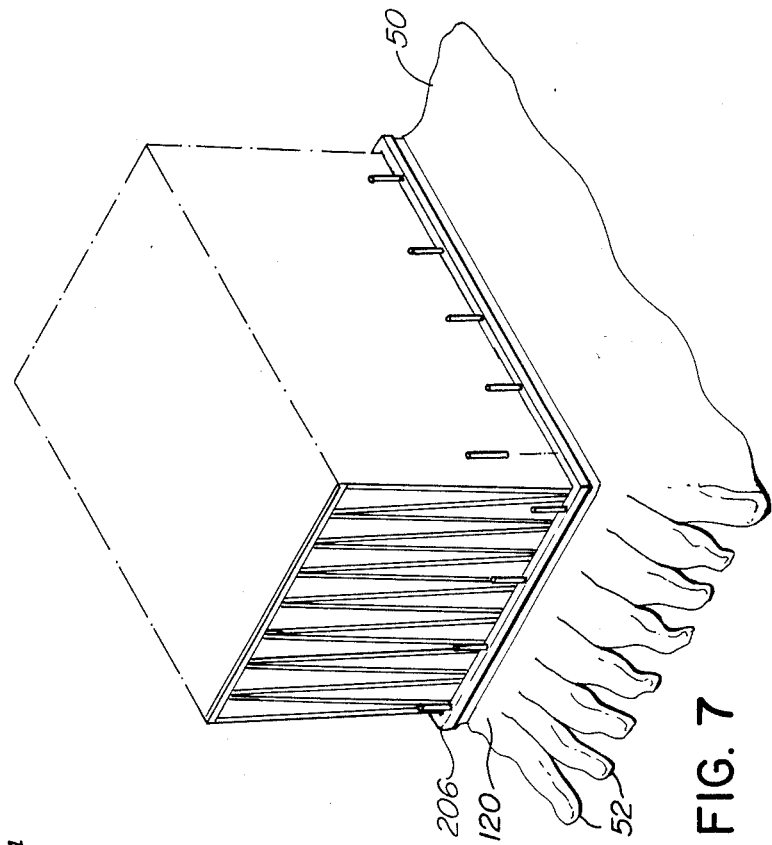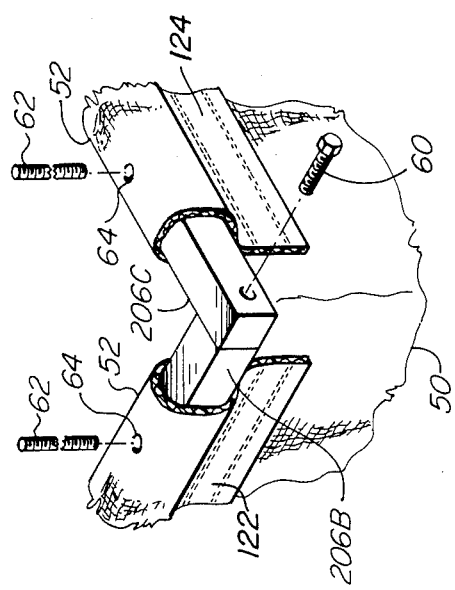

DUST COLLECTOR

This is a continuation of application Ser. No. 819,845, filed 1/17/86, now abandoned.

This invention relates to a dust collector or filter which may be used for large volume cleaning air for gases or for separating out industrial bi-products such as wood chips, sawdust, shavings, stone dust etc etc. The invention hereinafter will refer only to a dust collector although this term is intended to embrace at least all of the foregoing particulates.

Prior known apparatus for effecting the foregoing processes have included centrifuges, cyclones, vibrators, scrubbers, electrostatic devices, wet scrubbers deflectors precipitators, or combinations thereof.

The present invention relies on filtration or separation using only a uniquely configured medium hereinafter referred to as the filtration medium. It is a primary, but not exclusive purpose, to enable very large throughput, capable of separating or filtering of gases containing up to three or more tons of bi-product with a minimum pressure-drop across the device. No preliminary cycloning, to remove major particulates is necessary.

Prior known devices are typified by the following patents. Some of these prior known devices require vibration, alternating reverse flow, or alternating utilization of individual ones of a plurality of group of filtering devices.

Canadian Pat. No. 791,481 shows a plurality of parallel filter elements stretched across upper and lower frames. Such a device would progressively clog with the filtrate.

Canadian Pat. No. 885,589 contains a plurality of filter elements loosely fitted between rigid frame members. As the gas flow is from the inside to the outside the device would clog very easily.

Canadian Pat. No. 942,204 suffers the same disadvantage as the two previous patents.

Canadian Pat. No. 1,096,318 has wedge-shaped elements formed from a continuous strip of filter material, but it would appear that the elements, when formed of a continuous strip cannot have their respective ends closed to form integral bags.

U.S. Pat. Nos. 2,907,408; 3,187,489; 3,470,680; 3,606,739; 4,323,376 and 4,449,993 each contain open-ended filter elements which are sealed by an outer outer enclosure. U.S. Pat. No. 3,385,633 discloses separate filter bags.

It is a feature of one aspect of the invention to provide a dust collector suitable for high volume throughput of gases with dust, sawdust, stonedust or other particulates and for separating-out such materials.

It is a feature of another aspect of the invention to provide a dust collector having a multi-bag filter element comprised of a single integral piece of filtering material.

It is a feature of another aspect of the invention to provide a dust collector wherein the particulates collected fall free of the filter elements so as to increase the operating periods between emptying.

It is a feature of yet another aspect of the invention to provide a dust collector having a filter medium which may be replaced in a relatively short time.

A preferred embodiment of the invention will now be described with reference to the accompanying drawings, in which, FIG. 1 is a pictorial view of the entire dust collector, FIG. 2 is an isometric view, partly in section, depicting the inner structure of the dust collector shown in FIG. 1

FIG. 6 is an isometric view of one upper corner of the inner frame.

FIG. 7 is an isometric view of the support container, as in FIG. 5, with upper frame member in readiness for assembly into the filter.

Figure 1:
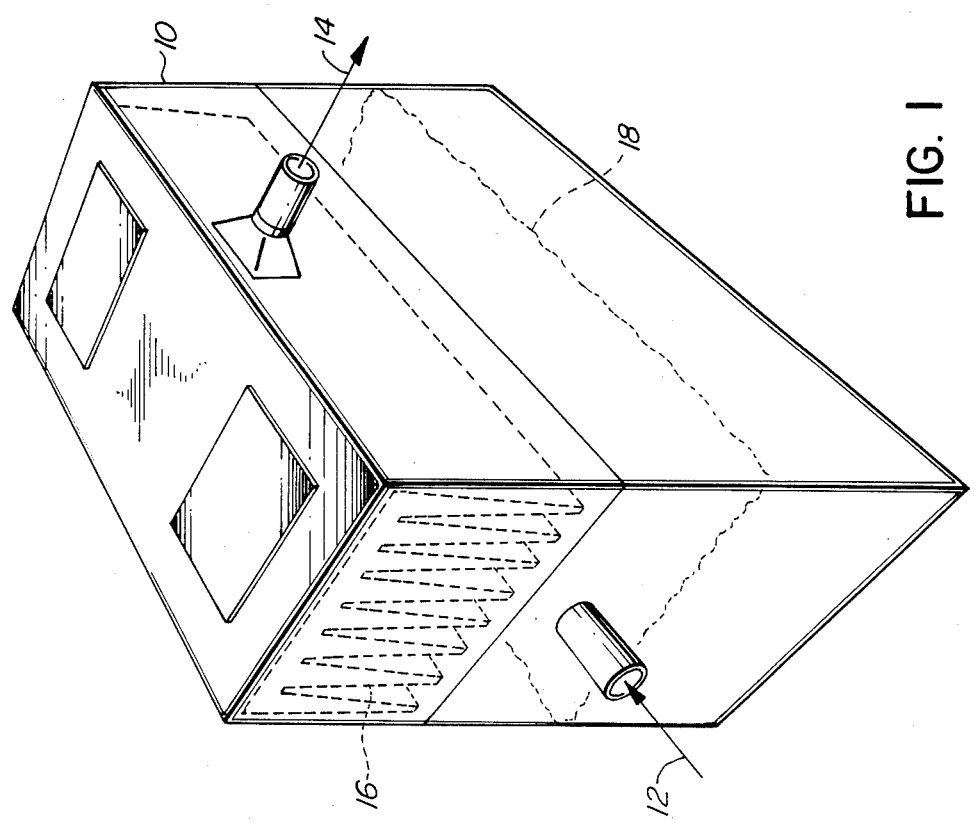

Referring now to FIG. 1, there is shown an isometric view of the outer container or enclosure generally indicated at 10 having a lower receiving space 18. Gas to be filtered enters the enclosure at inlet 12 and exits from the enclosure at outlet 14 located in the upper discharge space of the container 10 14. The particulate collecting filter assembly is shown in dotted lines at 16. By-products filtered out are collected in the lower receiving space 18.

Figure 2:
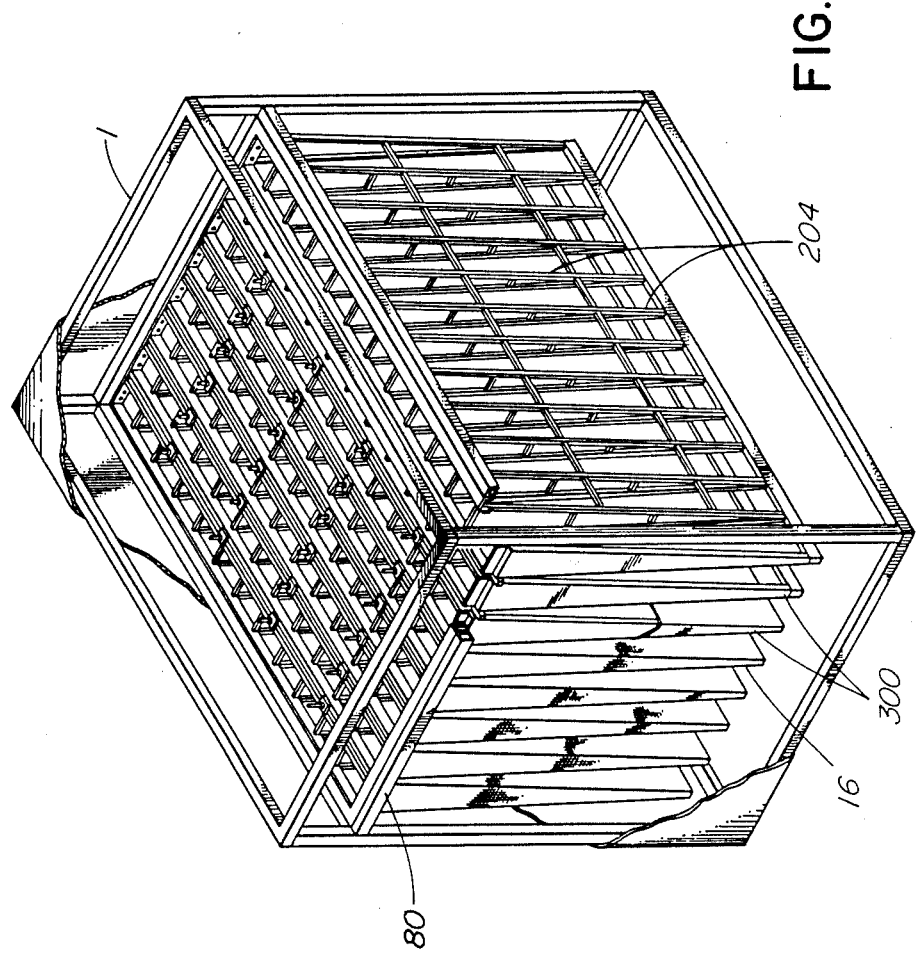

FIG. 2 is an isometric view, partly in section, of the container 10 with a multi-element filter assembly 16 wherein the integrally formed filter elements 300 have been assembled onto frame members 204 and drawn upwardly to an upper frame 80 into gas sealing engagement. As discussed in connection with FIG. 1, gas to be filtered is directed to the outside of the filter elements 16 where the gas passes into the interior of the elements, and exits from outlet 14, leaving dust or any other particulates to be collected on the exterior of the filter elements 16 or to fall to the bottom of the enclosure 10. Apart from the entry 12 and exit 14, the container is substantially airtight.

Figure 4:
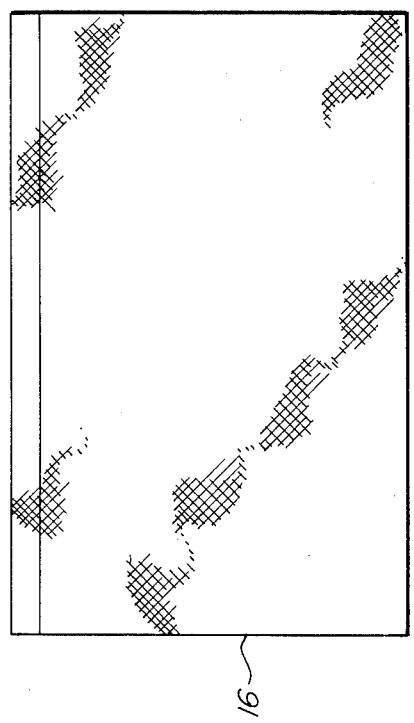
FIG. 4 is a side view of the filter assembly in FIG. 3
Figure 3:
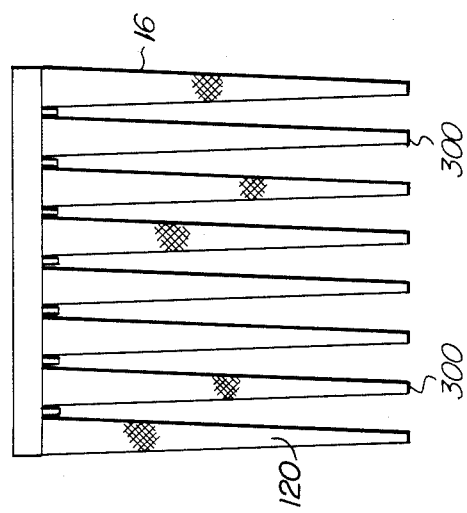
FIG. 3 is an end view of a filter assembly.

FIGS. 3 and 4 are simplified end and front views of the filter assembly. It will be observed that the passage for gas, defined by adjacent elements, converges upwardly so that the gas velocity through the individual filter elements, 300, is maintained substantially constant. In the present invention it has been found that the total filter area, i.e. that of all the individual elements 300 may be one hundred square feet for every one thousand cubic feet per minute of gas through-put. Such area provides a pressure drop of less than ten inches of water, although typical embodiments of the invention have provided between six and eight, inches of water, pressure drop. The individual filter elements 300 in one embodiment are approximately twelve feet long and eight feed high. Construction of the filter as a whole will be discussed in more detail hereinafter.

Figure 5:
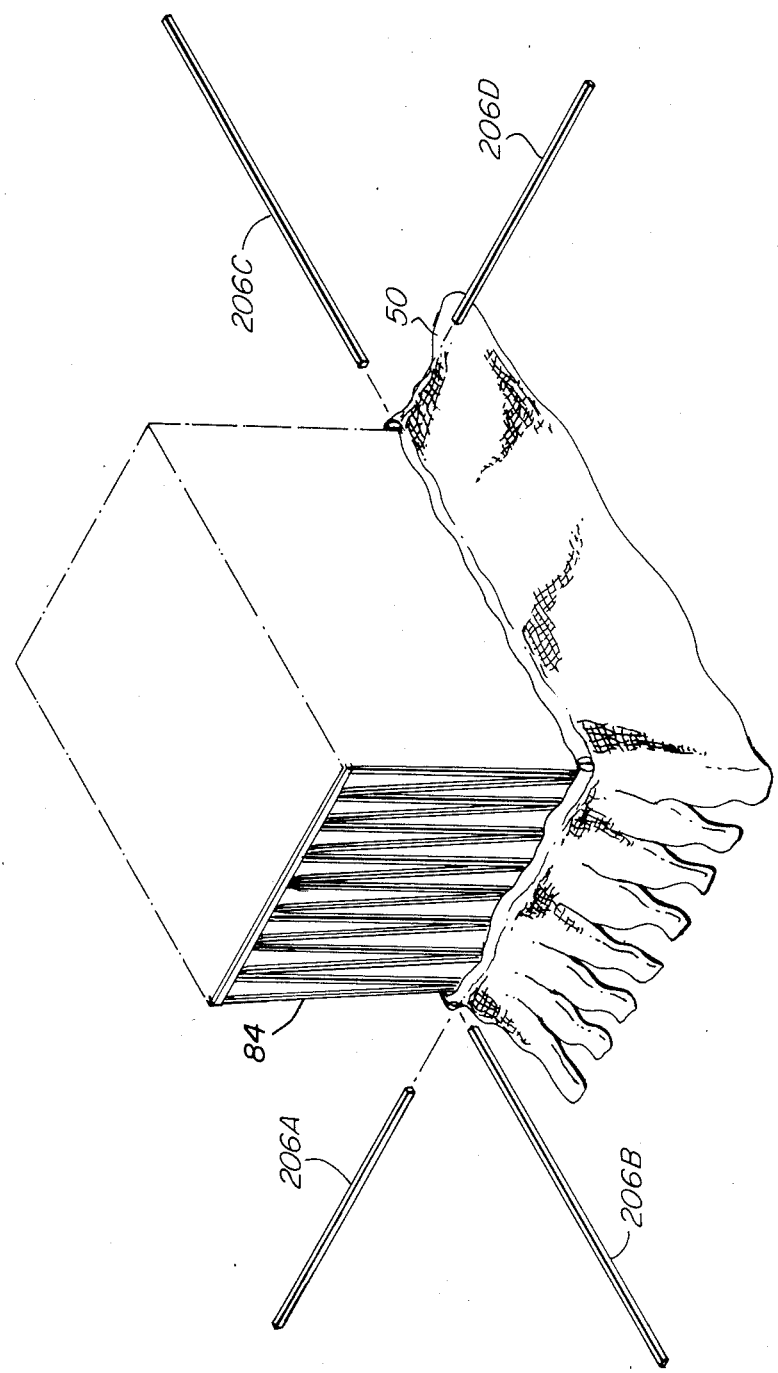
FIG. 5 is an isometric view of the inner frame support container with an integrally formed filter medium below the container prior to installation

FIG. 5 is a simplified isometric view of the inner frame 206 under which is deployed the integrally formed filter 50 prior to the raising thereof in a novel manner to be described hereinafter. The filter assembly 50 is provided with peripheral pockets 52 along the upper edges thereof, as best seen in FIG. 6.

Referring now to FIG. 6, there is shown, isometrically, one corner of the filter into which inner frame members 206B and 206C have been inserted and joined together suitably by fastening means, for example a screw or bolt 60. The joints between all four inner frame members 206A-206D are effected similarly. FIG. 7 indicates the fully assembled frame 206 before being raised. The filter is fastened to the said inner frame members 206A-206D by a plurality of screws or bolts which may be self-tapping or received in threaded holes in the inner frame members 206A-206D. The filter is preferably perforated with appropriate holes 64 prior to assembly. The holes 64 may be twelve or twenty four inches apart. In order to enhance the life of the filter assembly, the holes 64 may be provided with grommets, not shown.

Figure 8:
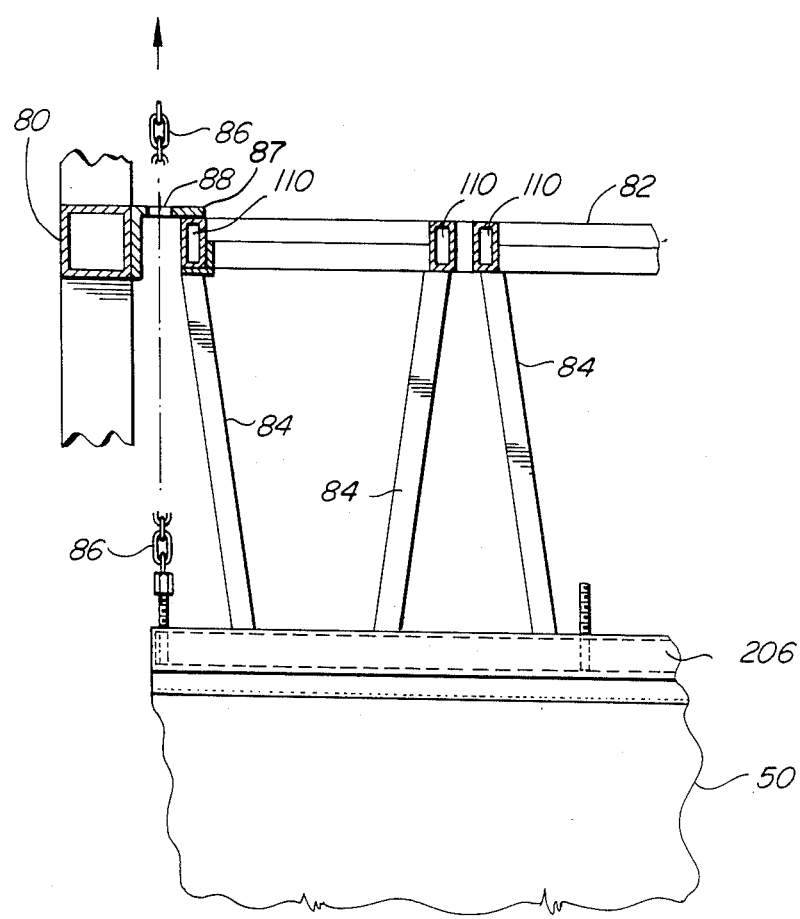
FIG. 8 is a side view of the inner frame with the filter in process of being installed
Figure 9:
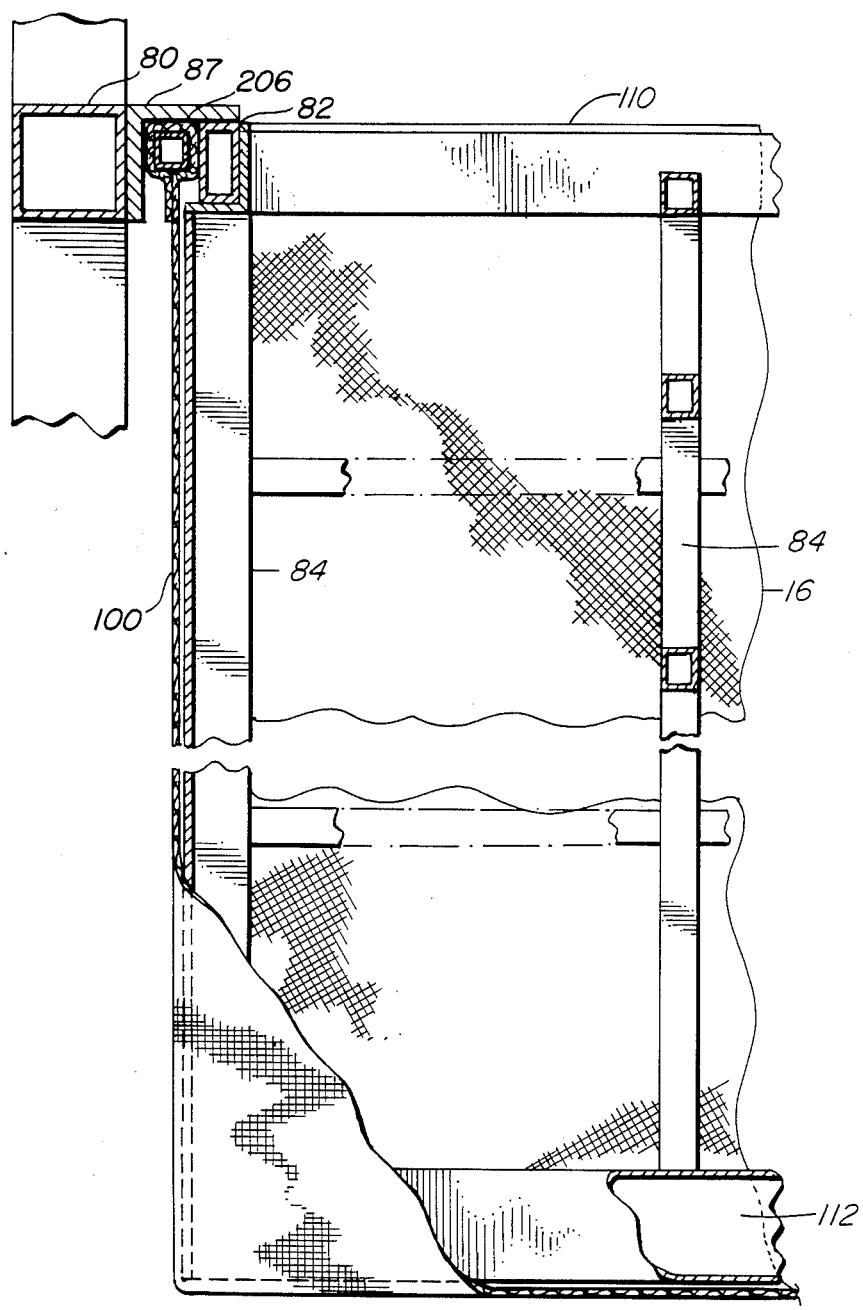
FIG. 9 is side view, in section, of the filter in its final position.

Referring to FIG. 8, there is shown an end view, partly in section, of a portion of an upper outer support frame 80 having a pair of end members and a pair of side members, all of which are fastened to the container at a location that separates the lower receiving and upper discharge spaces, see FIG. 2. FIG. 8 also shows, a portion of an end frame member 82, bag support frames 84 and the inner frame to which has been attached the filter bag assembly 16 constituted by a plurality of individual filter elements 300, in FIG. 3. An upper frame member 87 is attached to the fixed upper outer frame 80 along its inner perimeter (see FIG. 8). Upper end frame member 82 is attached to the corresponding upper frame member 87 (see FIG. 8). Similarly upper frame member 87 abuts upper longitudinally fixed frame member 110 and the two are attached together (see FIG. 8), as are end frame member 82 and longitudinal frame member 110.

Figure 10:
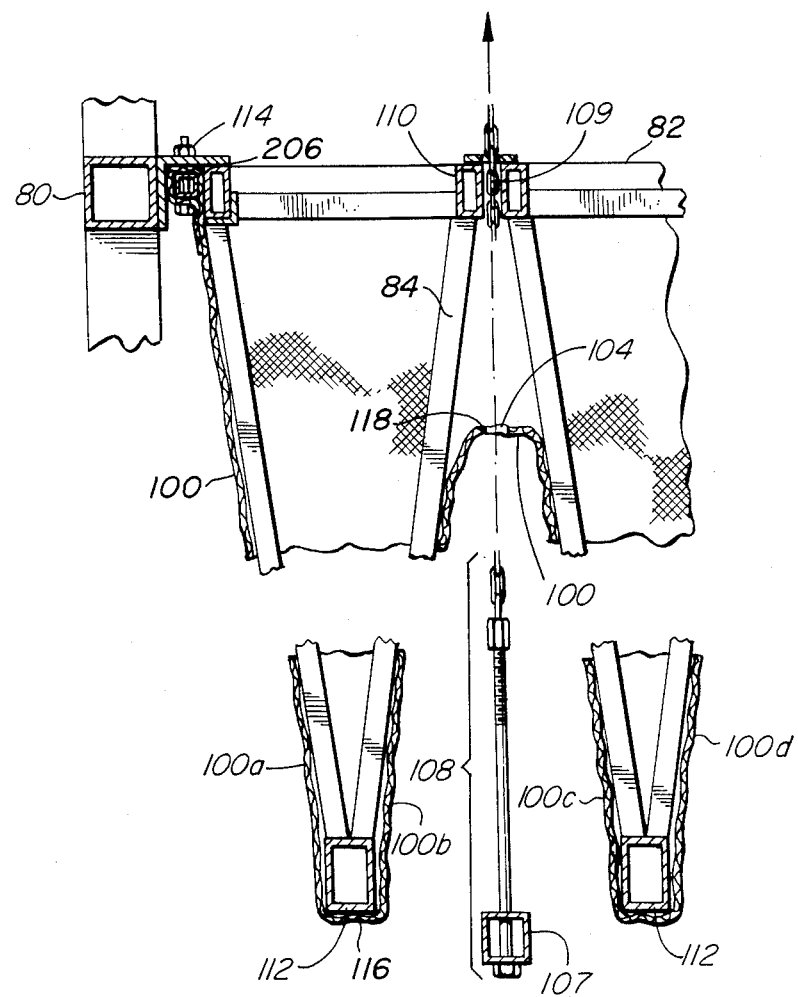
FIG. 10 is an end view, in section, of two of the filter elements partly raised, and also indicating the raising of the stretchers, and, FIG. 11 is an end view, in section, of the filter elements in their final position.
Figure 11:
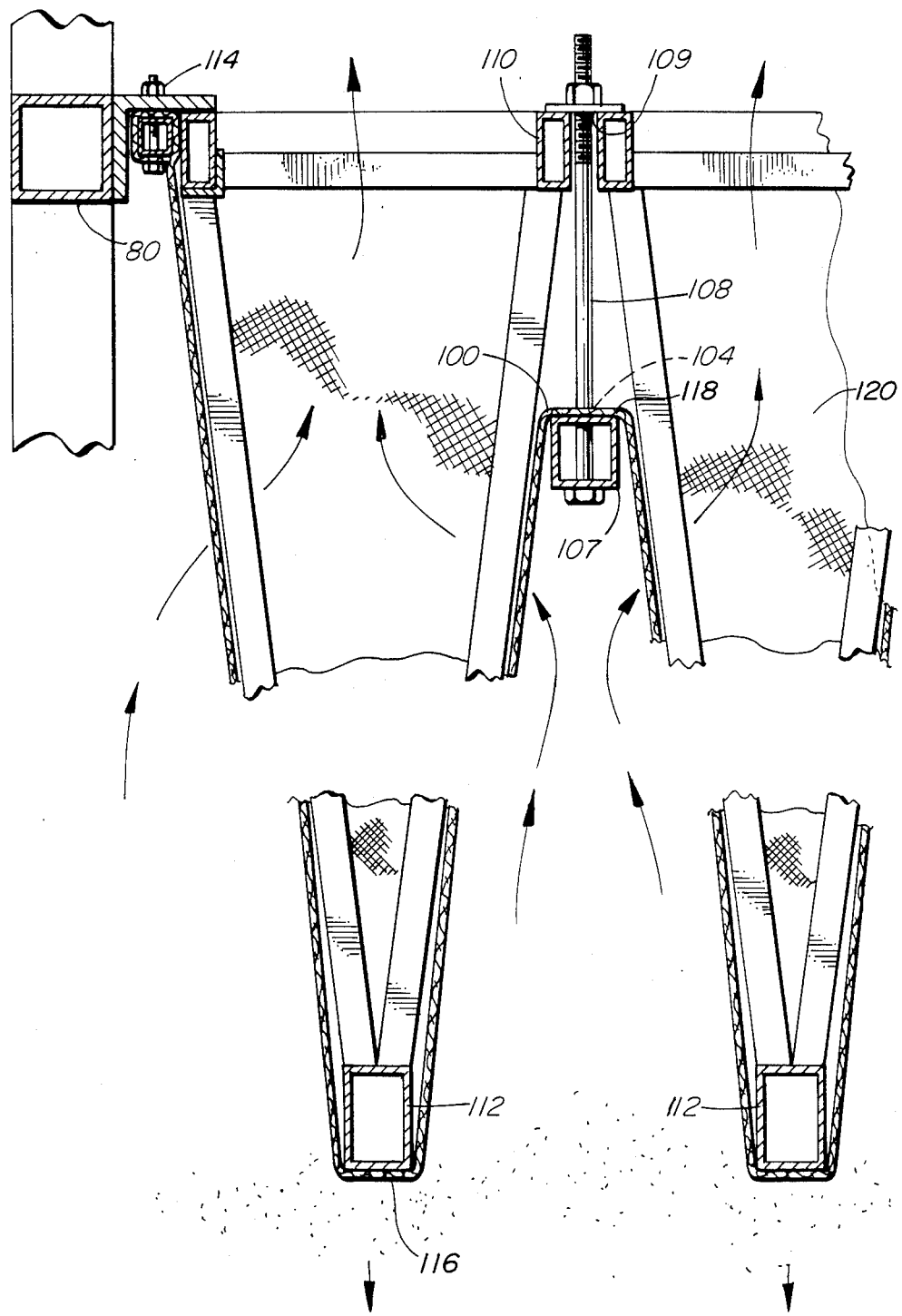

A plurality of pairs of inner and outer bag support frames 84 are attached with their upper ends to adjacent pairs of upper longitudinal fixed frame members 110. As shown in FIGS. 10 and 11, the lower ends of bag support frame members 84 are attached to a lower longitudinal fixed frame member 112, thereby forming, in transverse planes, a plurality of rows of bag supports which are longitudinally spaced apart. Those pairs of inner and outer bag support frame members 84 define an inverted triangular configuration.

As previously discussed, the filter assembly 50 comprises a plurality of individual elements 300 as shown in FIGS. 2 and 3. The elements 300 are collectively formed from a continuous length of filter medium 100 as best shown in FIG. 10. The filter medium 100 has a plurality of pockets 52, which are embracing all of bag support members 84. The pockets 52 are closed by integrally formed end panels 120 formed adjacent opposite ends of each of bag support members 84. One element in FIG. 10 has sides 100a and 100b while an adjacent element has sides 100c and 100d.

Sides or major areas 100a and 100b are connected to each other at their lower edges by means of relatively narrow lower joining portions, shown at 116, and sides or major areas 100b and 100c are connected to each other at their upper edges by means of relatively wide upper joining portions, show at 118. End panels 120 are connected to transverse hem portions 124, as shown in FIG. 6.

The outermost ones of the major areas or sides 100a are formed with longitudinal hems 122, as shown in FIG. 6. Those longitudinal and transverse hems 122 and 124 accommodate movable inner frame members 206 to which are also attached the temporary lifting chains 86, as shown in FIG. 8.

Once movable upper frame 206 is fastened to upper frame member 87, longitudinal lower stretchers 107 and a screw and chain assembly 108 are provided that pass through holes 104 in the upper joining portions 118 for pulling each of pockets 52 into close contact with associated collector support frames 84 in the plurality of rows of collector support members.

The upper fixed frame members 87 are provided with a plurality of spaced-apart first holes 88, and the inner movable frame members 206 are provided with a plurality of spaced-apart second holes 64, which are respectively aligned with first holes 88. The air-tight or gas sealing engagement with the container is performed by fastening bolts or screws connecting the fixed frame members 87 to inner movable frame members 206. The filter elements in FIG. 10 are shown before being stretched. The outermost side 100a, however, is shown attached to outer support frame 80 and upper frame members 87 by means of the bolts 62 with reference to FIG. 6. The ends of each filter element 300 are stitched or otherwise fastened together so that the filter element is closed at the base and at the ends thereof and being open at the top. The opposed ends of each filter element may each comprise an inverted and truncated triangularly shape end panel.

The filter bag assembly, end is drawn upwardly (See FIG. 8) by temporary lifting chains 86, only one of which is shown. Suitable lifting apparatus, not shown, can be used to pull the chains up. The upper frame 87 is, of course, provided with apertures 88 through which the chains may pass. The holes 88 may subsequently be used by clamp bolts 114 as seen in FIGS. 10 and 11.

Once the outermost side 100a of the filter assembly, as attached to the inner frame 206, has been fastened to the outer frame into gas sealing engagement 87, the intermediate portions 100 (See FIG. 10) are ready for raising. The filter assembly is perforated by a longitudinally disposed row of holes 104 which may be reinforced with grommets. Longitudinally placed movable stretchers 107 are placed beneath intermediate portions 118 and these portions pulled upwardly by a screw and chain assembly 10 which passes through holes 109 in upper inside longitudinal-fixed frame members 110. The upper holes 109 may subsequently be used to receive screws 108, with associated nuts, to stretch the filter medium in its final position. All holes in the filter medium may be provided with reinforcing grommets, not shown. The individual filter elements are pulled upwards against longitudinally disposed fixed lower frame members 112. When fully assembled the filter assembly is as shown in FIG. 11. The direction of gas flow is indicated in FIG. 11.

The wedge-shaped filter supports formed by the side members 100a, 100b, 100c, 100d etc etc. combined with the stretching means (i.e. members 112 and 107 in FIG. 11) ensure that the filter medium is not pushed inwardly under the influence of the gas flow. This prevents flow stoppage which could occur if opposing sides, i.e. 100a and 100b or 100c and 100d etc collapse inwardly to touch each other, as is a common phenomia with prior filters of the subject type.

The stretched filter medium has been found to promote easy dropping of the filtered-out particulate under the influence of gravity. In this case, reverse flow, scrubbing, vibration, prior cycloning and the like is unnecessary.

The advantage of a one piece filter comprising a plurality of integral filter elements is that the entire filter can be changed without disassembly of the supporting structure.

Considering that a filter assembly in accordance with the present invention may comprise eight filter elements of twelve feet in the longitudinal direction and eight feet in the vertical direction, two service personnel can change the entire filter assembly in less than three hours.

The collector in accordance with this invention cleans the dust or particulate laden gas to provide more than three to four tons of filtrate per hour with about sixteen hundred square feet of filter media and about one million cubic feet of unfiltered gas per hour and with a pressure loss of less than 5 to 10" of water depending on the filter media.

I claim:

1. Apparatus for removing solid particles from a large volume gas stream, said apparatus comprising:
   (i) a substantially airtight container (10) having a lower receiving space and an upper discharge space;
   (ii) inlet means (12) communicating with said receiving space;
   (iii) outlet means (14) communicating with said discharge space;
   (iv) one-piece particulate collecting means (16) disposed between said inlet means and said outlet means, said collecting means comprising:
   (a) upper, outer, support frame means (80) having a pair of end members and a pair of side members, all of which are fastened to said container in a plane that separates said lower receiving and upper discharge spaces, said upper outer fixed frame member (80) being provided with upper support frame members (87) being attached along the inner sides of said outer support frame (80), said upper support frame members (87) being provided with a plurality of spaced-apart first holes (88),
   (b) a plurality, n, of upper inside longitudinal fixed frame members (110), said plurality of inside longitudinal fixed frame members (11) being attached to said outer support frame members (80) and spaced between said pair of end members and a pair of said side members in parallel relationship to said side members; wherein outer ones of said inside longitudinal frame members 110 are in gas-tight engagement with said container,
   (c) a plurality, n−1, of lower longitudinal fixed frame members (112) disposed below said upper longitudinal fixed frame members (11) and supported therefrom by a plurality of pairs of inner and outer bag support frame members (84), upper ends of said frame members (84) are attached to adjacent pairs of said longitudinal fixed frame members (110) and the lower ends of said bag support frame members are attached to lower longitudinal fixed frame members (112), thereby forming, in transverse planes, a plurality of rows of bag supports which are longitudinally spaced apart along each of a plurality of longitudinal axes, so that said pairs of inner and outer bag support frame members (84) define an inverted triangular configuration;
   (d) a one-piece filter medium (100), said filter medium having a plurality of pockets, said pockets embracing all of said bag support members (84), in which said pockets comprise:
      a plurality of longitudinally disposed first sides (100a; 100c) having lower and upper ends and opposed ends;
      a plurality of longitudinally disposed second sides (100b; 100d) having lower and upper edges and opposed ends, each of said pockets being defined by opposed pairs of first and second sides;
      a plurality of longitudinally disposed upper joining portions (118), each one of which extends between associated upper edges of adjacent ones of said first and second sides; and
      a plurality of end panels (120) integrally joined with associated first ones of said opposed ends of said first and second sides and with associated second ones of said opposed ends of said first and second sides and further joined to the associated lower joining portion, thereby defining a plurality of closed pockets closed with an open top, said pockets being closed by said end panels (120) formed adjacent opposite ends of each of said bag support members (84);
   (e) stretcher means (86, 107, 108) cooperating with said upper joining members of said pockets for pulling each of said pockets into close contact with associated bag support frames in the said plurality of rows of bag support members;
   (f) an inner frame (206) formed of separatable members that are inserted into said one-piece filter medium (100) wherein said inner frame (206) together with said filter medium is attached to said upper outer support frame (80) by means of said upper support frame members (87) in gas sealing engagement; and wherein said separable members of said inner frame (206) are provided with a plurality of spaced-apart second holes (64) respectively aligned with said first holes (88) in said upper support frame members (87), and a plurality of fastening means (62) are arranged therebetween to effect said gas sealing engagement.

2. The apparatus of claim 1, wherein outermost ones of said first and second sides are formed with a longitudinal hems (122) adjacent said upper joining means and wherein said end panels are formed with transverse hems (124) adjacent said upper joining means, and wherein said longitudinal and transverse hems receive said movable inner frame (206).

3. The apparatus according to claim 1, wherein said plurality of said upper joining portions (118) accommodate said movable stretching means (107, 108) to permit portions (108) thereof to pass through said upper joining portions (118).

4. The apparatus according to claim 2, wherein said longitudinal hems (122) and said transverse hems (124) are all provided with a plurality of holes that are aligned with said first holes (88) of said upper frame member (87) and said second holes (64) of said movable inner frame member and wherein said upper joining portions (118) are provided with a third plurality of spaced-apart holes (104) for receiving said portions (108) of said stretcher means.

* * * * *